United States Patent [19]

Larumbe

[11] Patent Number: 5,425,328

[45] Date of Patent: Jun. 20, 1995

[54] BEACON FOR POWER LINES OR SIMILAR CABLES AND A DEVICE FOR ITS INSTALLATION

[75] Inventor: Fernando M. Larumbe, Salou, Spain

[73] Assignee: Sociedad Anonima de Performados Metallicos, Spain

[21] Appl. No.: 72,780

[22] Filed: Jun. 4, 1993

[30] Foreign Application Priority Data

Jun. 5, 1992 [ES] Spain ............................. 9201171

[51] Int. Cl.$^6$ ............................................ A01M 29/00
[52] U.S. Cl. ................................ 116/209; 116/22 A; 116/DIG. 33
[58] Field of Search ............ 116/22 A, 209, DIG. 33; 40/316; 174/40, 42, 112

[56] References Cited

U.S. PATENT DOCUMENTS 2,761,069  8/1956  Brayer ..................... 174/112 X
3,641,251  2/1972  Liao ........................... 174/40

FOREIGN PATENT DOCUMENTS 1321537  2/1963  France ..................... 40/316
8101786  7/1981  WIPO ..................... 116/22 A Primary Examiner—William A. Cuchlinski, Jr.
Assistant Examiner—Willie Morris Worth
Attorney, Agent, or Firm—Harrison & Egbert

[57] ABSTRACT

A beacon for power lines or similar cables, intended to scare birds and/or warn them of the existence of cables and having a central body attached to the line as a clamp, equipped with side fins, arranged vertically and with a color, layout and configuration consistent with the area's terrain and fauna. For installation, a car-shaped device, equipped with an electric motor and battery-operated, has been provided, which has a beacon charger and a device for setting down the same, which is moved through the line by remote control.

3 Claims, 3 Drawing Sheets

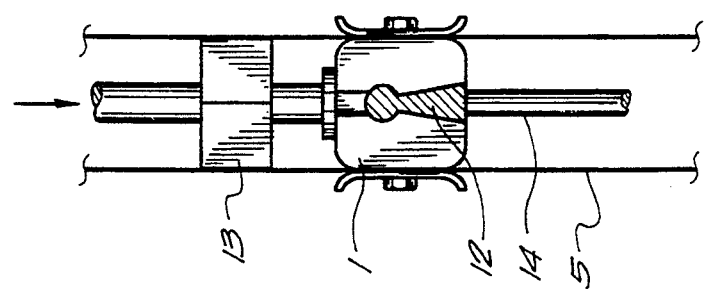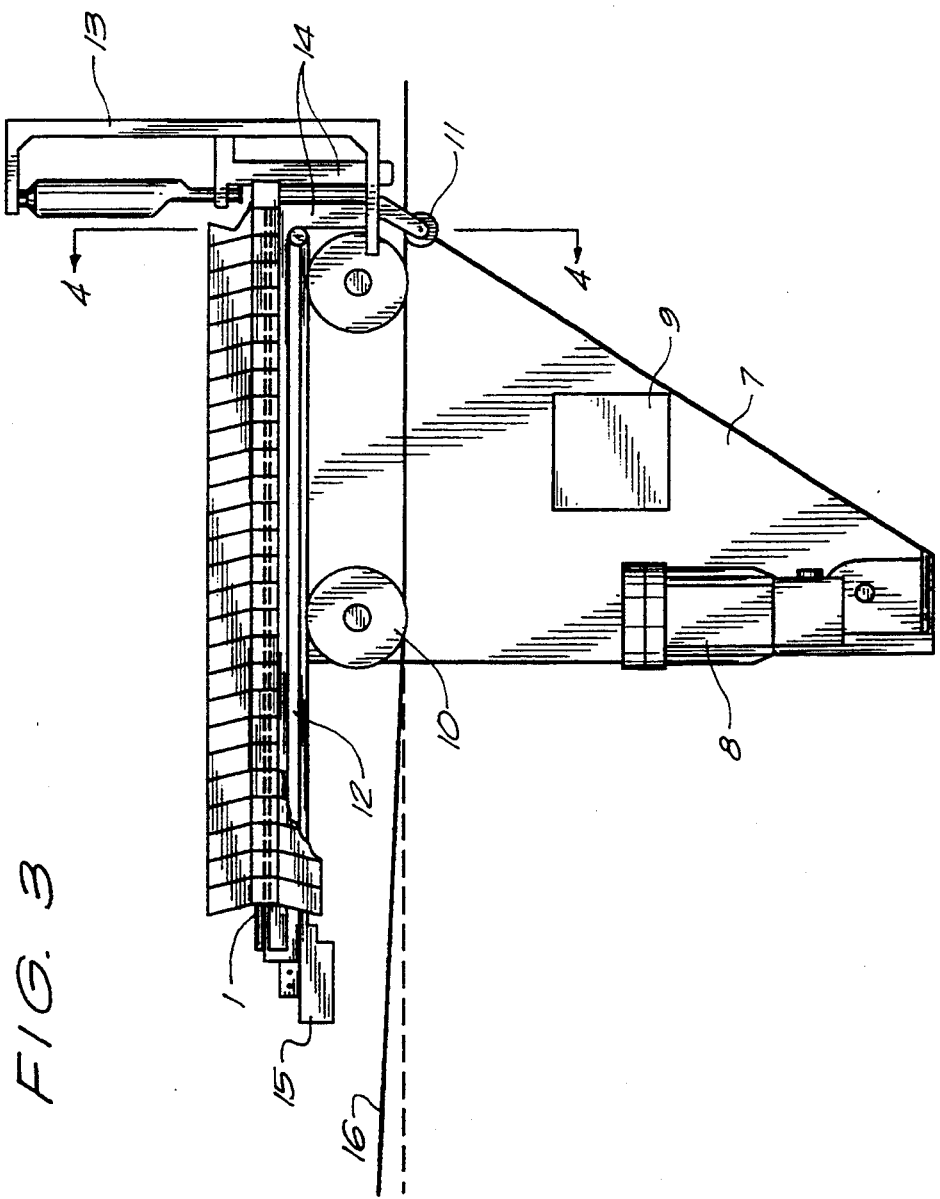

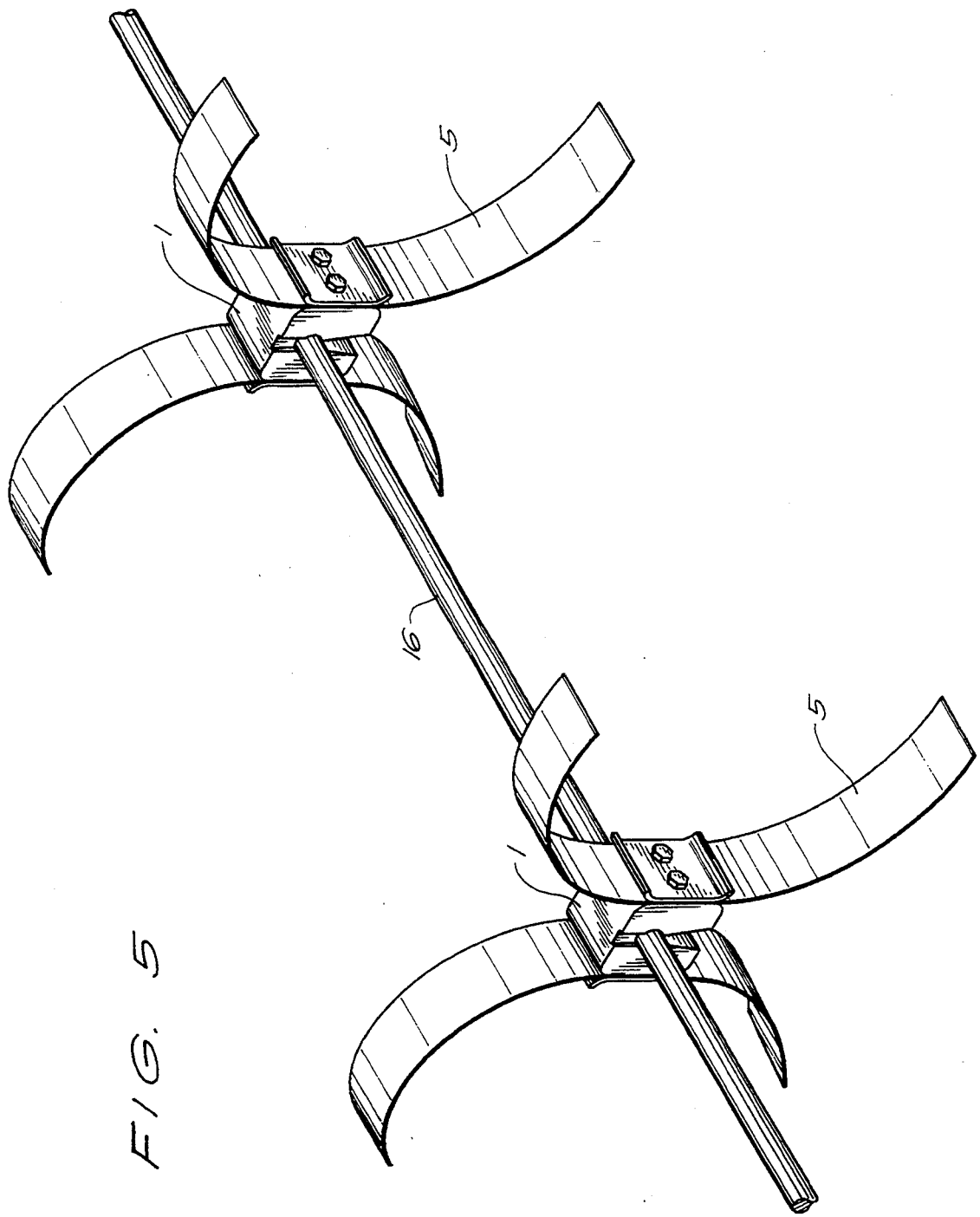

BEACON FOR POWER LINES OR SIMILAR CABLES AND A DEVICE FOR ITS INSTALLATION

TECHNICAL FIELD

This invention, as indicated by its name, pertains to as beacon for electric lines, intended, in principle to scare birds and to warn them of the existence of cables. Nevertheless, it may also serve as an aerial beacon reference for airplanes and helicopters that may fly over the area. This invention also covers a device used to install beacons of this type.

BACKGROUND ART

In general, the telephone line and power line cables, when the lines have a certain power, they have sufficient diameter so that on a clear day, these may be seen by the birds flying in the zone; however, this visibility is lost easily on cloudy days. Furthermore, normally, there is a neutral cable which, for purposes of safety, extends above the three cables which constitute the electrical phases and which normally have a smaller section than the latter; thus, from one side it is more difficult to see, and from the other side in the terrain, they are usually separated sufficiently from the phase cables because they weigh considerably more, thus adopting a more arched and closer configuration to the soil; therefore, centering in the view of the phase cables it is easy not to notice the existence of this fourth cable above the previous ones and, sometimes, quite a distance away. Needless to say that if this problem is transferred to the helicopters that may fly over the area, or even airplanes, the consequential loss of visibility and resulting collision against the cable would be serious.

Presently there are very few beacons with respect to the same and consequently they are more readily visible; there is also another type of beacon formed by a kind of fixed ball set on the cable by any method; in any of the cases, the beacon shows externally a glossy color, or it is even reflectant, visible from very far away.

The problem posed by these types of beacons is that they require handling by a technician for its installation. If it is installed without turning off power, the risk of possible loads discharged is very high for a worker and of course it is not assumable; to turn off the power supply on certain lines is an extremely costly operation and also it can only be done on certain days a week or a year, with prior notice to the users or the adoption of proper measures of bypassing power supply. To install these types of beacons, a trolley is mounted on the line and a worker climbs on top of it; the cable in question must support both the worker's and the trolley's weight, which we assume to be about 150 kilograms in the best-case scenario. Furthermore, we must take into account that this cable, since it is on top of the others, is subjected to power load discharges which continuously occur on the lines; therefore, it may be damaged at a given time or point of its travel and consequently it may not support the aforementioned weight at a given point in time; also, it is usually located on the top of a optical fiber cable which obviously does not withstand the tensional stress on a conventional metal cable, and said tensional stresses may affect the proper operation of the fiber. Finally, the worker not only runs some very high risks in the installation of this type of beacons, but also the installation of said beacons may cause the rupture or functional damage of the cable that will support them.

SUMMARY OF THE INVENTION

With this invention, the aforementioned problems are solved, since we have anticipated a beacon that can be installed without the need for handling by a worker, and a set of beacons is installed on a trolley that is mounted directly on the cable and is equipped with self-driven mechanisms and a remote control, whereby the necessary beacon or beacons are moved along the line as desired, and it is installed on those desired points. With this working system, human risks are avoided in the installation operation, but also this trolley obviously weighs well below the previous trolley and the worker's own weight; and with this, the cable is not subjected to high stresses that might cause its deformation, rupture or failure.

A beacon with these features covers a central body that has a generally parallelopiped-shaped shape and is equipped with side fins which are generally arranged vertically and that have a color, layout and configuration according to the terrain and the fauna in the area. This body has a central orifice of a diameter slightly smaller than the cable, so that it can be securely contained in it and an access through which an opening connects to the lower face with a progressive amplitude to the outside so that we are able to introduce the same in the central orifice so that it easily plugs on the cable so that pushing this central body down.

The fins of this beacon are of a material sufficiently flexible to bend against the wind. Since the fins are perfectly visible and have the ability to move, the fins do not cause an increase in the tensional stresses on the line that might cause deformation or rupture of the cable. Also, this flexibility gives it an appearance of a bird of prey in flight, which will scare other birds in the area.

As we already mentioned, this line is installed automatically by a device designed specially for this purpose, which consists of a trolley that goes up the line and has some tractive mechanism capable of moving along the cable and a remote control whereby it drives at a given moment a beacon setting device, arranged in a charger placed on the trolley itself.

DESCRIPTION OF THE DRAWINGS

These and other features of this invention will be understood more easily with the help of the following description based on a practical example; said description is given with the help of the attached drawings, in which:

FIGS. 3 and 4 show a beacon-installing device, placed on a line and an enlarged vertical section of a beacon-setting mechanism placed on top of the same.

FIG. 5 shows a power line carrying several beacons of this type.

DESCRIPTION OF THE INVENTION

Figure 1:
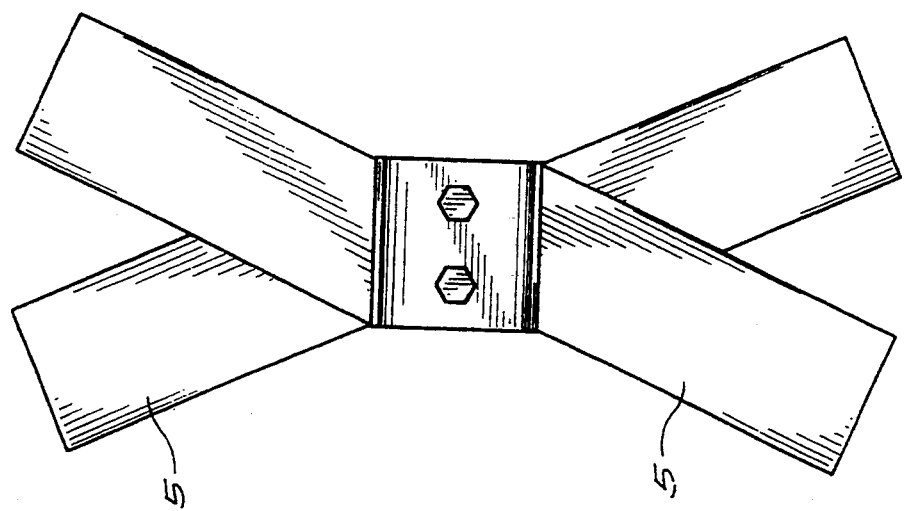
FIG. 1 shows an overall view of a beacon prepared according to the invention.

The beacon hereunder includes a central body (1) which is to be set on a cable (16), that shows in general a configuration in the shape of a parallelopiped-shaped block, equipped with a center drill (2) which is accessed from a socket (3) arranged preferably toward the lower face. Said socket (3) is wider toward the outside so that it can be located directly on the cable (16), and it is necessary to press the block (1) downward to make it go over the edges of the socket in the orifice (2) until it rests on the body (1) perfectly held on the cable and in a fixed position.

Figure 2:
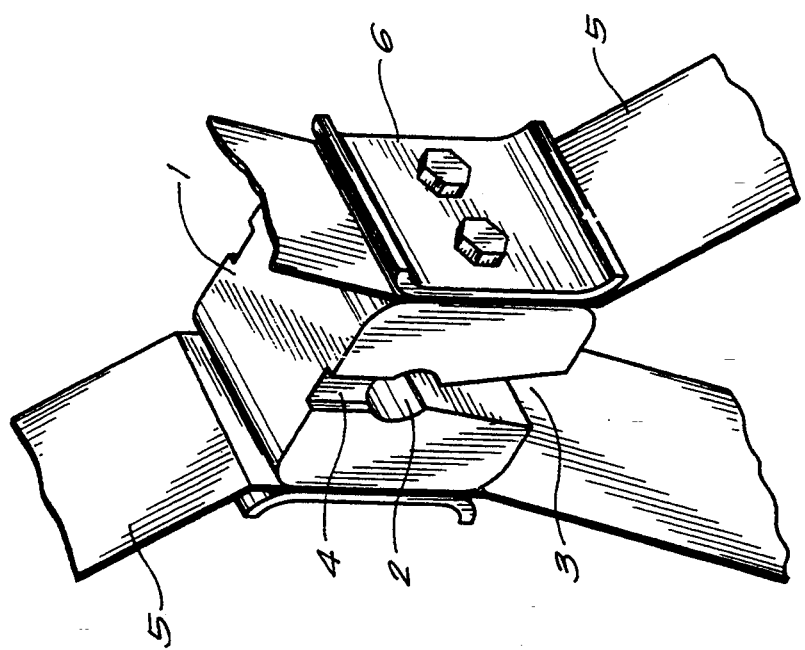
FIG. 2 is given with an side elevation view from one of these beacons.

Extending out from this central body (1) there are some fins (5) which are generally arranged vertically, preferably in slanted and opposite directions, so that they would be more readily visible from the sides, as shown on FIG. 2. In spite of what is indicated, the configuration, ornamentation and arrangement of said fins must not be considered limited, and they may consequently adopt any one based on the color and characteristics of the terrain so that they may be more readily visible; also, it will be based on the fauna of the area intended to be saved, since obviously if what is intended, for example, is to save certain birds who are afraid of the buzzards or eagles, the arrangement would be in a way similar to these birds of prey so that they would be warned not only of the presence of cables, but also to scare them away from the zone through which the power line passes. In any event, the fins are made from a synthetic material which becomes more flexible and generally are set on the central body (1) by lateral plates (6) which ensure the adoption of a vertical arrangement, also allowing them to bend sufficiently with the wind so that no lateral tensions are caused on the line that might affect the cable structure and also give it the appearance of a bird in flight. In general, it has a divergent arrangement, forming an "X"-shaped elevation or any other one that is visible in any direction.

This component may be equipped also with a strip, adhesive or photoluminescent reinforcement that at dawn it shines in such a way that is seen more easily at times of intense lighting.

Block (1) shows on the sides perpendicular to the fins (5) certain guides (4) that are going to facilitate automatic installation as depicted on FIGS. 3 and 4 and as described below.

In FIG. (3) we see a beacon installation device consisting of a trolley (7) which is equipped with an electric motor (8), driven by a battery (9), both set on the trolley (7) itself. This trolley has wheels (10) on the top which move on the cable (16), as well as a wheel (11) which is placed below the cable to prevent sudden wind gusts or any other abrupt movement of the trolley during the installation operations that could cause it to slide off fan from the cable. At least one of the drive wheels (10) is driven by the motor (8) so that the trolley moves along the line, in the case depicted from right to left, setting the beacons (1) down on a suitable place.

Above the structure of the trolley there is a longitudinal loader (12), set above the cable (16) and reasonably parallel to the same. This loader has a tension element (15) that pushes the beacon assembly (1) to a beacon-setting component, installed on the back side with respect to the trolley forward direction. In general, this loader consists of a guide (12) that has a section similar to the hole (2) and (3) of the beacons, and is equipped with a pusher that directs them to the rear face where the beacon setting component is located. This beacon setting component consists of a cylinder (13) which acts on a vertical direction and which, as shown in FIG. 4, pushes a given beacon (1) connecting to its opening (3) on the cable (16) exerting force up and down until it is able to plug it in said cable, and the orifice (2) surrounds it at that point. To perform this installation operation in a guided fashion, the beacon (1) has, as we have already stated, certain lateral guides (4), similar to other ones (14) placed on the structure of the charger component, so that each beacon moves from the charger to the cable guided vertically and thus plugs directly into the same without the possibility of a lateral movement in any direction falling into empty space and may not be installed.

In this trolley we have not depicted a device with a clutch function which, set on the top, would disengage the drive wheel (10) so that, if any damage were to occur in the remote control or in the operation of the trolley, one may be able to send a second backup trolley, equipped with a hook which, connected in this clutch, would release the drive wheel and pull the damaged trolley to the nearest turret in order to lower it or make the proper repairs at that point.

Also not depicted on the figures is a possible a device to pull out beacons of this type in the case that at a given moment, one wishes to pull them out from a specific line to install different ones. A puller with these features would substitute the guides (14) by a kind of hook placed below the cable (16), equipped with a drive in a vertical direction so that by placing it below the body (1) of a given beacon, and pulling up on said body, one may be able to pull it out of the cable so that it may go into a free fall.

The beacons installed on a power line are set in the position depicted in FIG. 5, bending its upper wings so that it simulates a bird of prey in flight, which contributes to scare off other birds.

Once the nature of this invention, as well as a method to implement it, are sufficiently described, we only have to add that, as a hole and parts comprising it is possible to introduce changes in form, materials and arrangement, provided that said changes do not vary substantially the characteristics of the invention that are claimed below:

I claim:

1. A beacon for a power line comprising a central body clamped to the line, said central body having side fins, said side fins arranged vertically, said side fins having a color consistent with a terrain and fauna of an area in which the line is located, said central body having an internal cavity, said central body having a socket opening to a face of said central body and opening to said internal cavity, said socket having a width suitable for allowing the line to slide therethrough, said fins having a divergent arrangement forming an X-shaped configuration.

2. The beacon according to claim 1, said central body having an overall configuration of a parallelopiped-shaped block, said internal cavity having a diameter smaller than the line, said socket opening on a lower face of said central body, said socket being wider at said lower face than at said internal cavity, said side fins affixed to sides of said central body so as to extend in a generally vertical position.

3. The beacon according to claim 1, said fins are of a flexible synthetic material, said fins being sufficiently flexible so as to bend in response to wind acting thereon.

* * * * *